US006976347B2

(12) United States Patent
Karman et al.

(10) Patent No.: US 6,976,347 B2
(45) Date of Patent: Dec. 20, 2005

(54) SURFACE PASTEURIZATION METHOD

(75) Inventors: Vernon D. Karman, Poynette, WI (US); Gary Lee Hahn, Sun Prairie, WI (US); Craig R. Bonneville, Appleton, WI (US); Tou T. Vang, Lodi, WI (US); Nelly Feze, Madison, WI (US); Robert E. Hanson, Middleton, WI (US)

(73) Assignee: Alkar-Rapidpak, Inc., Lodi, WI (US)

(*) Notice: Subject to any disclaimer, the term of this patent is extended or adjusted under 35 U.S.C. 154(b) by 54 days.

(21) Appl. No.: 10/614,962

(22) Filed: Jul. 8, 2003

(65) Prior Publication Data

US 2004/0105927 A1 Jun. 3, 2004

Related U.S. Application Data

(63) Continuation-in-part of application No. 10/243,093, filed on Sep. 13, 2002, now Pat. No. 6,843,043.

(51) Int. Cl.[7] ........ B65B 1/20
(52) U.S. Cl. ........ 53/428; 53/431; 53/432
(58) Field of Search ........ 53/428, 431, 432, 53/433, 434, 510, 111 R, 511, 512, 79

(56) References Cited

U.S. PATENT DOCUMENTS

| | | | |
|---|---|---|---|
| 2,364,049 | A | 12/1944 | Bensel |
| 2,779,681 | A | 1/1957 | Sell et al. |
| 3,597,228 | A | 8/1971 | Jeppson et al. |
| 3,843,806 | A | 10/1974 | Kishpaugh et al. |
| 3,889,009 | A | 6/1975 | Lipoma |
| 3,906,115 | A | 9/1975 | Jeppson |
| 3,961,090 | A | 6/1976 | Weiner et al. |
| 3,966,980 | A | 6/1976 | McGuckian |
| 4,391,862 | A | 7/1983 | Bornstein et al. |
| 4,448,792 | A | 5/1984 | Schirmer |
| 4,656,042 | A | 4/1987 | Risler |
| 4,737,373 | A | 4/1988 | Forney |
| 4,897,985 | A | 2/1990 | Buchko et al. |
| 4,909,022 | A | 3/1990 | Kubis et al. |

(Continued)

FOREIGN PATENT DOCUMENTS

| | | |
|---|---|---|
| EP | 0261929 | 3/1988 |

OTHER PUBLICATIONS

Asselbergs, E.A. et al; *Studies on the Application of Infrared in Food Processing*; Plant Research Institute, Canada Department of Agriculture, Ottawa; 1960; pp. 449-453.

(Continued)

*Primary Examiner*—Eugene Kim
(74) *Attorney, Agent, or Firm*—Andrus, Sceales, Starke & Sawall, LLP

(57) ABSTRACT

A method for processing a food product involves transporting the food product through a plurality of stations including a loading station, a pasteurization station, and a closing station. The surface of the food product is pasteurized by convectively transferring heat from the pasteurizing medium to the surface of the food product at a rate such that the surface heat transfer coefficient becomes sufficiently higher than the food product conductance coefficient that the surface temperature of the food product is substantially instantaneously elevated above temperatures which are instantly lethal to microbes which may be present. Preferably, steam is condensed on the food product surface in dropwise condensation, and the onset of film condensation is retarded by removing condensate film from such surface.

5 Claims, 5 Drawing Sheets

U.S. PATENT DOCUMENTS

| | | | |
|---|---|---|---|
| H762 | H | 4/1990 | DeMasi et al. |
| 4,948,610 | A | 8/1990 | Goglio |
| 5,001,878 | A | 3/1991 | Sanfilippo et al. |
| 5,043,175 | A | 8/1991 | Bayley et al. |
| 5,155,974 | A | 10/1992 | Garwood |
| 5,170,611 | A | 12/1992 | Buchko et al. |
| 5,205,110 | A | 4/1993 | Buchko |
| 5,269,216 | A | 12/1993 | Corominas |
| 5,271,207 | A | 12/1993 | Epstein et al. |
| 5,281,428 | A | 1/1994 | Morgan |
| 5,298,270 | A | 3/1994 | Morgan |
| 5,344,609 | A | 9/1994 | Long |
| 5,356,649 | A | 10/1994 | LaMotta et al. |
| 5,366,746 | A | 11/1994 | Mendenhall |
| 5,374,437 | A | 12/1994 | Lagares Corominas |
| 5,443,150 | A | 8/1995 | Buchko |
| 5,466,498 | A | 11/1995 | Forloni et al. |
| 5,470,597 | A | 11/1995 | Mendenhall |
| 5,512,312 | A | 4/1996 | Forney et al. |
| 5,514,403 | A | 5/1996 | Webb et al. |
| 5,524,419 | A | 6/1996 | Shannon |
| 5,537,916 | A | 7/1996 | Lagares-Corominas |
| 5,682,729 | A | 11/1997 | Buchko |
| 5,711,981 | A | 1/1998 | Wilson et al. |
| 5,741,536 | A | 4/1998 | Mauer et al. |
| 5,749,203 | A | 5/1998 | McGowan, Jr. |
| 5,785,270 | A | 7/1998 | Buchko |
| 5,822,951 | A | 10/1998 | Rosik |
| 5,834,049 | A | 11/1998 | Kageyama |
| 5,932,265 | A | 8/1999 | Morgan |
| 5,952,027 | A | 9/1999 | Singh |
| 6,085,490 | A | 7/2000 | Buchko |
| 6,086,936 | A | 7/2000 | Wilson et al. |
| 6,202,388 | B1 | 3/2001 | Sanfilippo et al. |
| 6,245,294 | B1 | 6/2001 | Goldberg et al. |
| 6,269,946 | B1 * | 8/2001 | Colombo ................. 206/213.1 |
| 2002/0119073 | A1 | 8/2002 | McGowan, Jr. et al. |
| 2004/0018283 | A1 | 1/2004 | Hirschey et al. |
| 2004/0018284 | A1 | 1/2004 | Kuethe et al. |

OTHER PUBLICATIONS

Ginzburg, A.S.; *Application of Infra-red Radiation in Food Processing*; Chemical and Process Engineering Series; C.R.C. Press-Cleveland; 1969; pp. 292-297.

Dagerskog, Magnus; *Infra-Red Radiation for Food Processing II. Calculation of Heat Penetration During Infra-Red Frying of Meat Products*; Lebensm.-Wiss. u.—Technol., 12; 1979; pp. 252-256.

Blankenship, L.C. et al; *Cooking Methods for Elimination of Salmonella typhimurium Experimental Surface Containment from Rare Dry-Roasted Beef Roasts*; Journal of Food Science, vol. 45 (1980); pp. 270-272.

Sandu, Constantine; *Infrared Radiative Drying in Food Engineering: A Process Analysis*; Department of Food Science, University of Wisconsin-Madison, Madison, Wisconsin; Biotechnology Progress (vol. 2, No. 3); Sep., 1986; pp. 109-119.

Hallstrom, Bengt et al; *Heat Transfer and Food Products*; Elsevier Science; New York, New York, 1988; pp. 214-231.

*Radiant Wall Oven Applications*; Pyramid Manufacturing, 1996.

Hanson, Robert E.; *Reducing Process Variation in the Cooking and Smoking Process*; Processing Technologies; American Meat Science Association; 50th Annual Reciprocal Meat Conference; 1997; pp. 33-42.

*Browning in Traditional Continuous Ovens Up and Down or Sideways Only*?; Unitherm Food Systems, Inc.; Unitherm Bulletin; Jul. 16, 1997.

Islam, MD. Mahbulbul; *Shelf Life Extension and Pathogen Reduction of Fresh Chicken Through Surface Pasteurization Using Radiant Heat and Anti-Microbial Agents*; UMI Dissertation Services, A Bell & Howell Information Company; 1998; pp. 1-139.

Shackelford, S.D. et al; *Effects of Blade Tenderization, Vacuum Massage Time and Salt Level on Chemical, Textural and Sensory Characteristics of Precooked Chuck Roasts*; Journal of Food Science, vol. 54, No. 4, 1989; pp. 843-905.

Hardin, Margaret D. et al; *Survival of Listeria Monocytogenes in Postpasteurized Precooked Beef Roasts*; Journal of Food Protection, vol. 56, Aug., 1993; pp. 655-659.

Cooksey, D. Kay et al; *Reduction of Listeria Monocytogenes in Precooked Vacuum-Packaged Beef Using Postpackaging Pasteurization*; Journal of Food Protection; vol. 56; Dec., 1993; pp. 1034-1038.

Shaw, Robert; *Extending the Shelf-Life of Chilled Ready Meals*; Meat Quality and Meat Packaging; 1998; pp. 359-367.

Rhodehamel, E. Jeffery et al; *Post Processing Pasteurization of Processed Meats*, American Meat Science Association; Annual Reciprocal Meat Conference; vol. 52; Jun. 23, 1999; pp. 113-114.

*Proceedings of the 1993 Food Preservation 2000 Conference*; Science and Technology Corporation; October 19-21, 1993; Natick, Massachusetts; pp. 512-520.

Leistner, Lothar et al; *Food Preservation by Hurdle Technology*; Elsevier Science Ltd.; Trends in Food Science & Technology; Feb., 1995 (vol. 6); pp. 41-46.

Gould, G.W.; *New Methods of Food Preservation*; Blackie Academic & Professional; 1995.

Marth, Elmer H.; *Extended Shelf Life Refrigerated Foods: Microbiological Quality and Safety*; FoodTechnology; Scientific Status Summary; vol. 52, No. 2; Feb., 1998; pp. 57-62.

Leistner, Lothar; *Combined Methods for Food Preservation*; Handbook of Food Preservation; Marcel Dekker, Inc.; New York, New York, 1999; pp. 457-484.

Leistner, Lothar; *Basic Aspects of Food Preservation by Hurdle Technology*; Elsevier Science.; International Journal of Food Microbiology 55; 2000; pp. 181-186.

AMI Annual Convention; *Update: Post-Process Surface Pasteurization of Ready-to-Eat Meats*; Oct. 24-26, 2002; New Orleans, LA.

Delaquis, P.J. et al; *Microbiological Stability of Pasteurized Ham Subjected to a Secondary Treatment in Retort Pouches*; Journal of Food Protection; vol. 49; Jan., 1986; pp. 42-46.

Mulder, R.W.A.W. et al; *The Microbiological Shelf Life of Vacuum Packed Broiled Chickens*; Archiv for Lebensmittelhygiene; (5); May 31, 1999; pp. 108-111.

McGuckian, Col. Ambrose T.; *The A.G.S. Food System—Chilled Pasteurized Food*; May, 1969; pp. 87-89.

Stanek, T.G.; *Precooked Pork Loin For Further Process*; Cryovac memo; Feb. 17, 1986.

Albertsen, Soren; *Alkar Sales Activity Report*; Jun. 16, 1999.

Cargill, *Product Specification for Riverside Smoked Deli*; Jun. 26, 1992.

Unitherm, *Pasteurizing protection*, showing public use in 1997 at Plainville Farms, Plainville, NY.

Hanson, *Brine Chilling of Roasted Pork and Poultry Products for Bil Mar Foods*; Dec. 14, 1995.

Alkar, *Bil Mar Zeeland, MI Serpentine Chiller Plant Layout*, Mar. 4, 1996.

Hanson, *Post packaging pasteurization*; Alkar memo to Bil Mar; Jun. 25, 1998.
Bil Mar, *Food Service Brochure for Sara Lee Turkey products*; Dec. 29, 1998.
Bil Mar, *Food Service Priority List by SKU for Post Pasteurization of Key Products*; Dec. 29, 1998.
Bil Mar, *Surface Thermal Processing Product List*; Jan. 7, 1999.
Wasson, *Alkar Sales Activity Report re Bil Mar Zeeland, MI plant*; Jan. 7, 1999.
Betley, Alkar *Pasteurization Tests for Bil Mar Foods*; Jan. 20, 1999.
Wasson, *Alkar Sales Activity Report re Bil Mar Zeeland, MI plant*; Feb. 19, 1999.
Alkar, *"Revised" Proposal, 1 of 3, One* (*1*) *Field Erected Continuous Vertical Serpentine Hot Water Pasteurization Zone to be Added to the One* (*1*) *Field Erected Continuous Vertical Serpentine Brine Chiller* (*Ref. JT 3067*) *that is at Alkar's Plant in Lodi, Wisconsin*; Jun. 3, 1999.
Bil Mar, *Purchase Order for Serpentine Hot Water Pasteurization Zone for Bil Mar Zeeland, MI*; Jun. 4, 1999.
Alkar, *Bil Mar Zeeland Pasteurizer/Chiller Plant Layout*; Jul. 12, 1999.
Specialized Patent Services, U.S. Trademark Application for *Stamp Design*; Serial No. 75/655508; dated Mar. 8, 1999.
Unitherm, *Smoking and Browning under 10 minutes!*; advertisement; Meat & Poultry magazine; Apr. 28, 1998.
Canadian Institute of Food Science and Technology, *Applied Technology, Food Preservation by Combined Methods*, Food Research International 25 (1992) 151-158.
*Steam Surface Pasteurization of Beef Frankfurters*; M. Cyganarowicz-Provost, R. C. Whiting and J.C. Craig, Jr.; Journal of Food Science—vol. 59, No. 1, 1994, pp. 1-5.
Morgan, Arthur I. et al; *Surface Pasteurization of Raw Poultry Meat by Steam*; U.S. Department of Agriculture Research, Agriculture Research Service, Eastern Regional Research Center (Received May 15, 1995; accepted Sep. 21, 1996); 199th Academic Press Limited.
Morgan, Arthur I., et al; *Ultra High Temperature, Ultra Short Time Surface Pasteurization of Meat*; Journal of Food Science—vol. 61, No. 6, 1996 (pp. 1216-1218).
Kozempel, Michael, et al; *Application of the vacuum/steam/vacuum surface intervention process to reduce bacteria on the surface of fruits and vegetables*; Innovative Food Science & Emerging Technologies 3 (2002) 63-72; US Department of Agriculture, Agricultural Research Service, Eastern Regional Research Center, Engineering Science Research Unit; Accepted Jan. 6, 2002; 2002 Elsevier Science Ltd.; pp. 63-72.
Kozempel, Michael, et al; Journal of Food Protection, vol. 63, No. 4, 2000, pp. 457-461: *Rapid Hot Dog Surface Pasteurization Using Cycles of Vacuum and Steam to Kill Listeria innocua*; U.S. Department of Agriculture, Agricultural Research Service, Eastern Regional Research Center; Engineering Science Research Unit; MS 99-252; Received Aug. 27, 1999/Accepted Nov. 5, 1999; pp. 457-461.

* cited by examiner

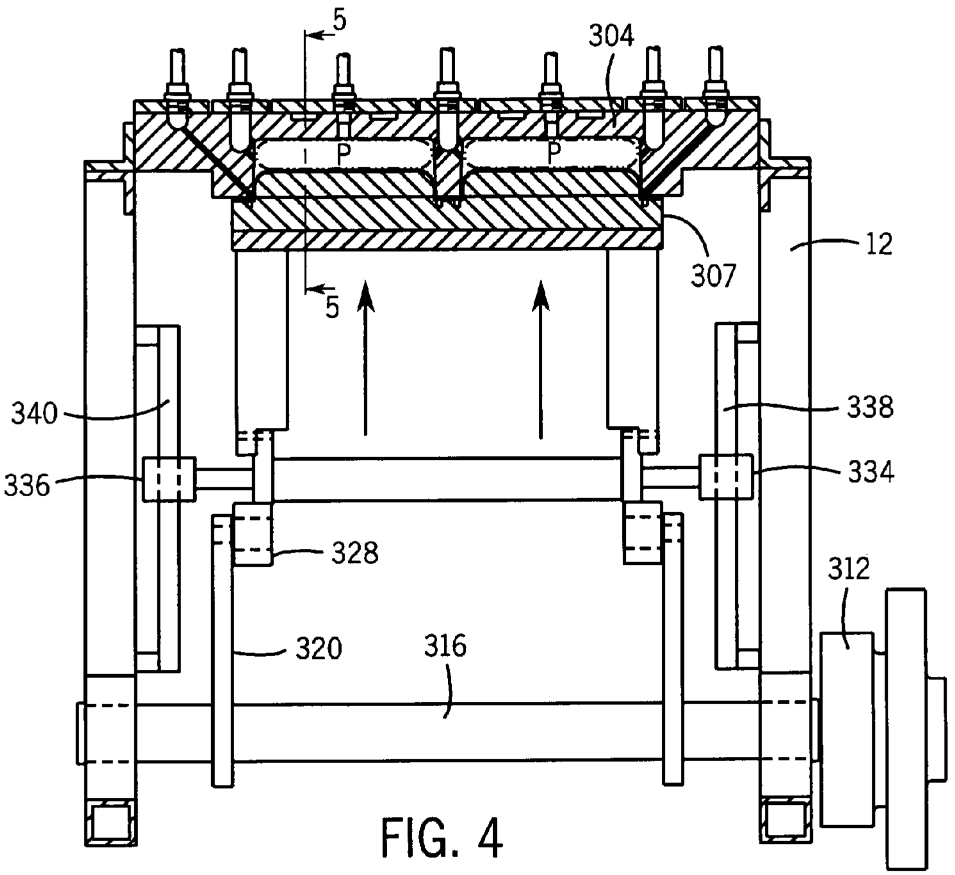
FIG. 4
FIG. 5
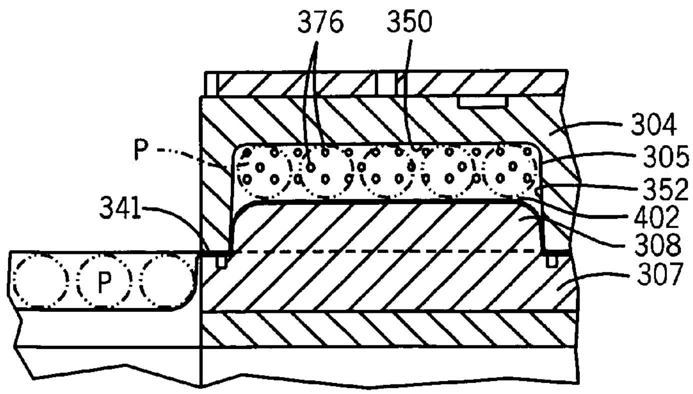

SURFACE PASTEURIZATION METHOD

CROSS REFERENCE TO RELATED APPLICATION

This application is a continuation-in-part of U.S. patent application Ser. No. 10/243,093, filed Sep. 13, 2002 now U.S. Pat. No. 6,843,043.

BACKGROUND AND SUMMARY

The invention relates to methods for pasteurizing the surface of a food product during processing, including hot dogs, chicken strips, turkey breasts, ham, cheese, and other pre-cooked food products.

Parent Application

The invention of the above-noted parent application relates to web packaging apparatus and methods transporting a web through a series of stations, for example forming a lower web into a component of a package receiving a food product and closed by an upper web.

Web packaging machines and methods are known in the prior art, for example U.S. Pat. No. 5,170,611, incorporated herein by reference. The apparatus packages a food product between upper and lower webs. A web transport conveyor transports the lower web through a series of stations which form the lower web into a component of a package at a forming station, and receive the food product at a loading station, and close the package with the upper web at a closing station. The parent invention provides a pasteurization station pasteurizing the food product. In preferred form, the pasteurization station is between the loading station and the closing station and pasteurizes the food product in a simple effective manner readily and seamlessly incorporated into the packaging line.

Present Application

The present invention arose during continuing development efforts relating to the above-noted parent invention, including the objective of eliminating pathogenic surface microbes that may have re-contaminated the outer surface of the food product during chilling or handling prior to packaging. Pasteurization is desirable for destroying most disease-producing micro-organisms.

The process is carried out very rapidly with a compact station added to the existing packaging line so as to maintain throughput and avoid major facility layout changes that would be associated with longer processes.

In the preferred embodiment of the present approach, the surface of the food product is pasteurized at the last possible point in the process before it is sealed into the final package. This prevents another recontamination opportunity.

The method of the present invention may be carried out in conjunction with the web packaging apparatus and system of the noted parent application, or with other packaging apparatus such as rotary-bagging packaging machines, a stand alone decontamination system for surface pasteurizing of non-packaged food products or ingredients, and other systems.

BRIEF DESCRIPTION OF THE DRAWINGS

FIG. 4 is like FIG. 3 and illustrates sequential operation.

FIG. 5 is a view taken along line 5—5 of FIG. 4.

DETAILED DESCRIPTION

Parent Application

Figure 1:
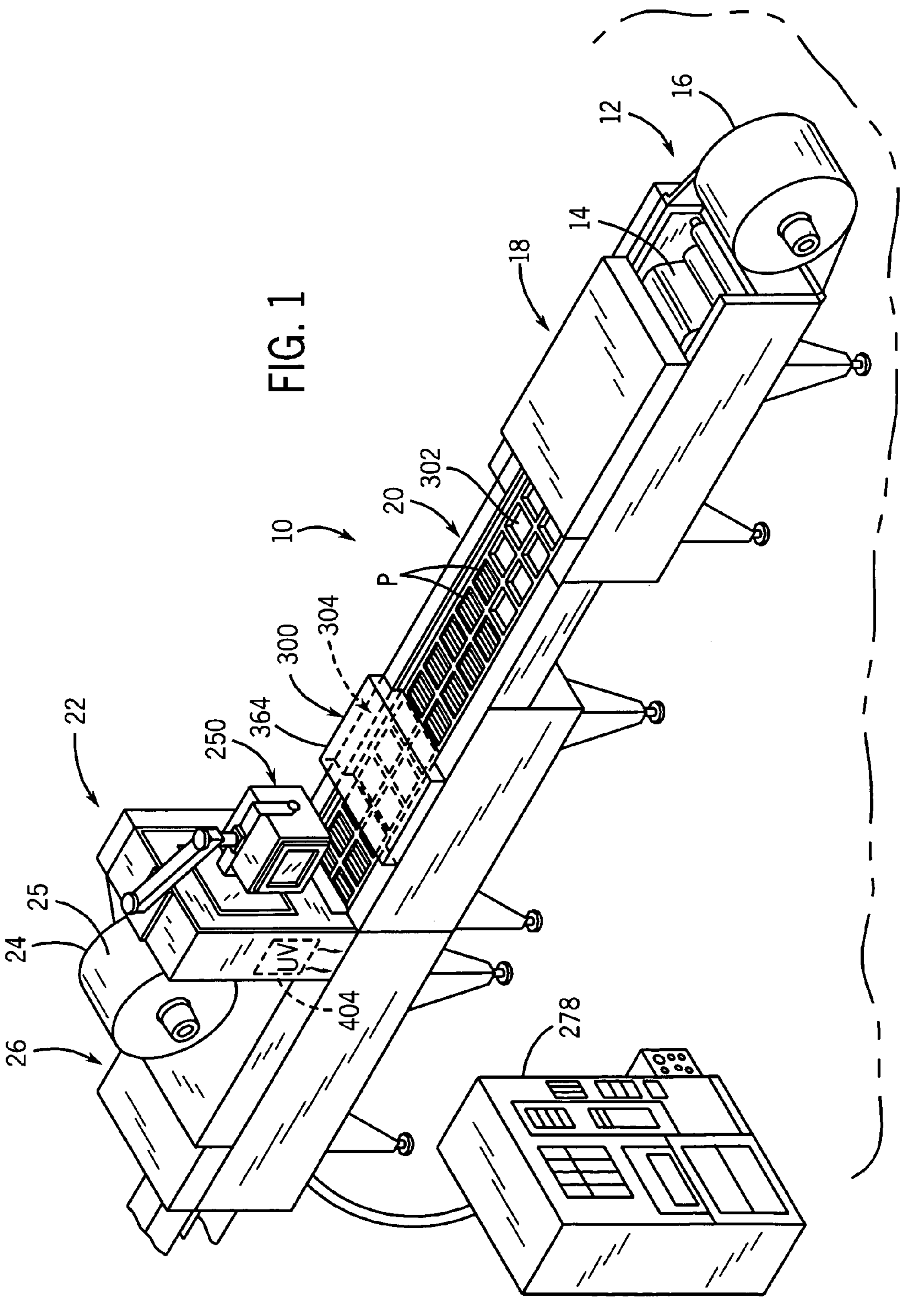
FIG. 1 is an isometric view of web packaging apparatus for carrying out the method in accordance with the invention.

FIG. 1 illustrates a packaging machine 10 and is like FIG. 1 of incorporated U.S. Pat. No. 5,170,611 and uses like reference numerals therefrom where appropriate to facilitate understanding. As noted in the '611 patent, packaging machine 10 generally includes a lower web supply station 12 for supplying a lower web 14 of flexible packaging material from a supply roll 16, a forming station 18, a loading station 20, an upper web supply station 22 for supplying an upper web of flexible packaging material 25, and a downstream station 26 closing the package. As described in the '611 patent, the web transport conveyor provided by machine 10 transports lower web 14 through the noted series of stations which form the lower web into a component of a package at forming station 18, and receive the food product such as hot dogs P at loading station 20, and close the package with the upper web 25 at closing station 26. The webs are advanced by the indexing apparatus disclosed in the '611 patent, as controlled by the control modules 250 and 278, also as set forth in the '611 patent, to which further reference may be had. The conveyor advances from upstream to downstream, wherein closing station 26 is downstream of loading station 20, and loading station 20 is downstream of forming station 18.

Figure 2:
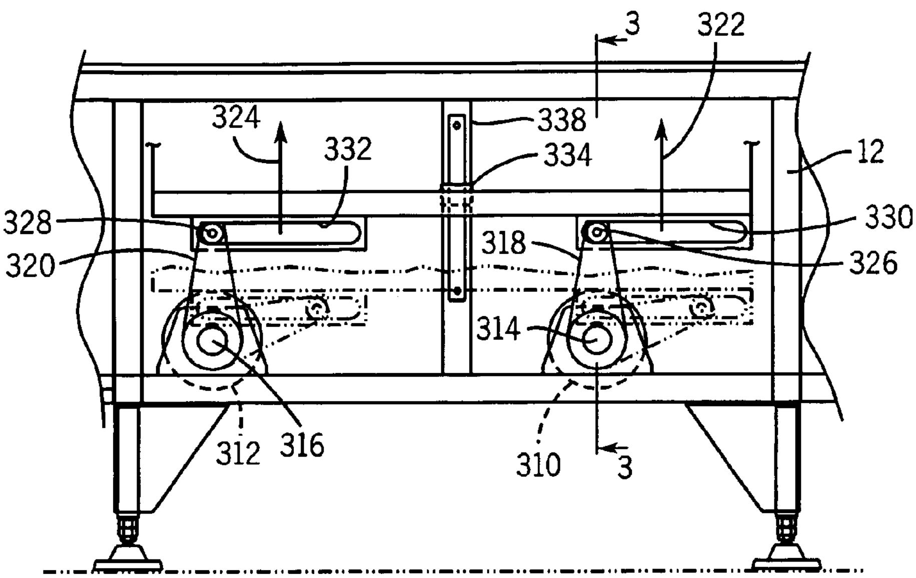
FIG. 2 is a side view partially cut away of a portion of the apparatus of FIG. 1.

The parent invention provides a pasteurization station 300 pasteurizing food product P. Pasteurization station 300 is between loading station 20 and closing station 26. Pasteurization station 300 is downstream of loading station 20, and is upstream of closing station 26. Forming station 18 forms a downwardly depending product cavity pocket 302, FIGS. 1, 9, 3, in lower web 14 into which food product P is loaded, in accordance with the noted '611 patent. Pasteurization station 300 includes an upper chamber 304, FIG. 8, having a downwardly facing pasteurization cavity 306 facing product cavity pocket 302, FIG. 3, and pasteurizing food product P, to be described. Upper chamber 304 is above web 14. The pasteurization station includes a lower chamber 307 preferably provided by a form-inverter 308, FIGS. 8, 3, below the web and movable upwardly, FIG. 4, to engage the underside of web 14 and push food product P upwardly into pasteurization cavity 306 in upper chamber 304. Form-inverter 308 is preferably moved upwardly and downwardly by servo motors comparably to those used in the '611 patent for raising and lowering the forming box at forming station 18 for forming the noted product cavity pocket, for example as shown in FIGS. 2, 4, 5 of the '611 patent. Servo motors 310, 312, FIG. 2, rotate respective shafts 314, 316 which in turn rotate respective lift arms 318 and 320 from the lower position shown in dashed line in FIG. 2 to the upper position shown in solid line in FIG. 2 to in turn move form-inverter 308 upwardly as shown at arrows 322, 324, comparably to the upward movement provided by lift arms 128 and 216 in FIGS. 2 and 5 of the '611 patent. Roller members 326, 328 at the ends of respective arms 318, 320 roll along respective cam slots 330, 332 along the underside of form-inverter 308 comparably to roller member 132 in FIG. 5 of the '611 patent rolling along cam slot 134. The form-inverter is guided for up-down reciprocal movement by plastic bearing blocks 334, 336 sliding along vertical guides 338, 340 of frame 12, comparably to plastic bearing blocks 140 and guides 144 of the '611 patent. Upper and lower chambers 304 and 307 mate, FIGS. 4–7, to form a pressure-containing vessel 305 enclosing cavity 306 sealed along its periphery in gasket-like manner by web 14 engaged between members 304 and 307 as shown at portion 341.

Figure 3:
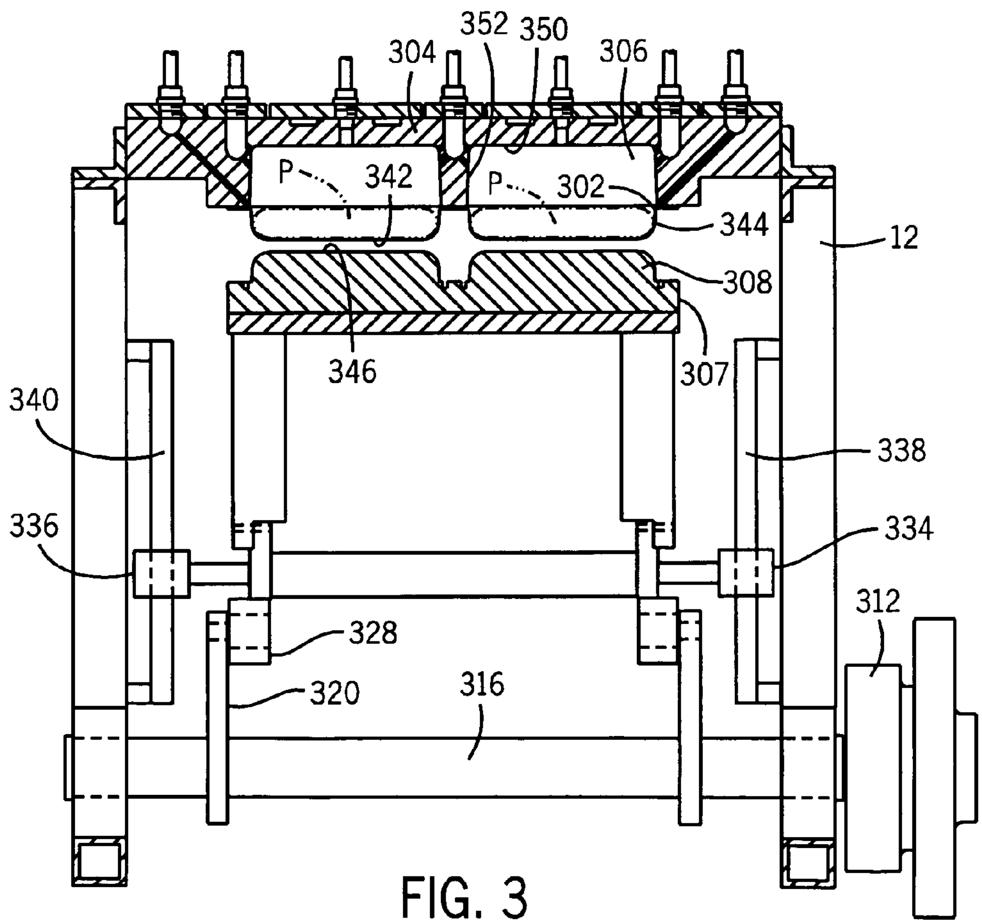
FIG. 3 is a view taken along line 3—3 of FIG. 2.
Figure 8:
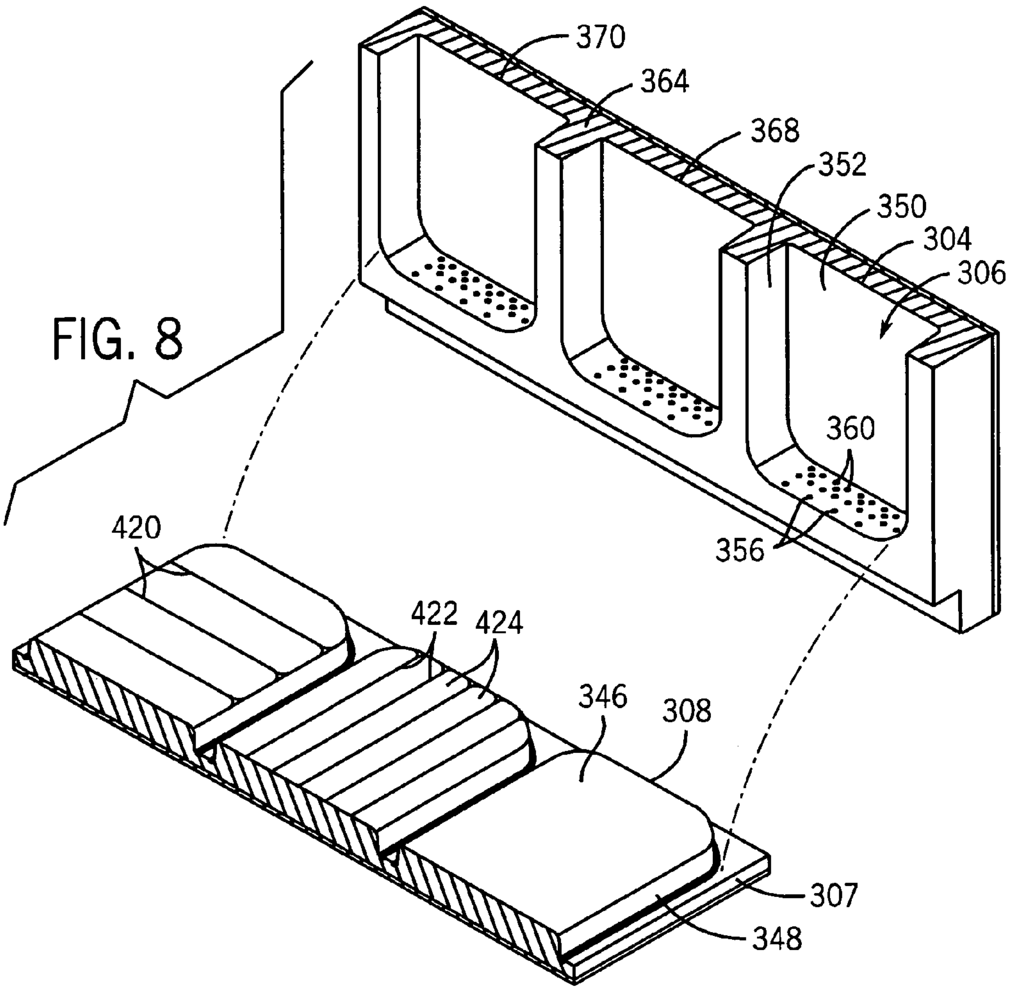
FIG. 8 is an exploded isometric view partially folded away of a portion of the structure of FIG. 6.
Figure 10:
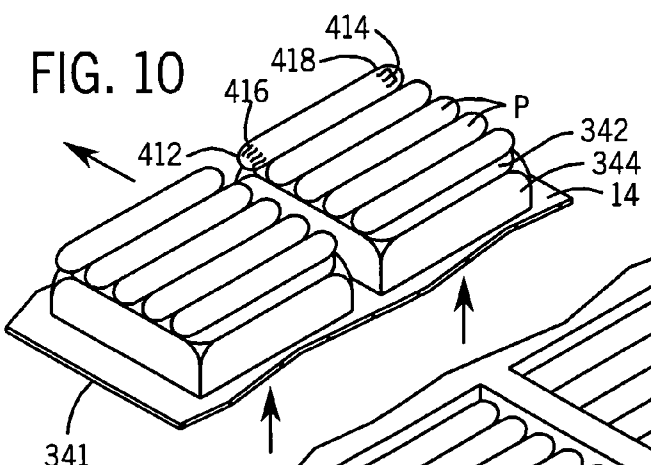
FIG. 10 is like FIG. 9 and illustrates sequential operation.
Figure 9:
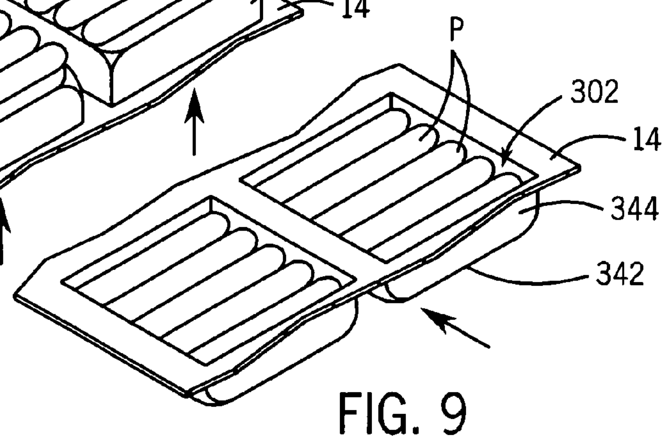
FIG. 9 is an isometric view of a portion of FIG. 3.

Product cavity pocket 302 of web 14 has a first condition, FIGS. 9, 3, at pasteurization station 300, with the downwardly depending product cavity pocket 302 having a lower central wall 342 and a plurality of sidewalls 344 extending upwardly therefrom. Product cavity pocket 302 has a second condition, FIGS. 10, 4, at the pasteurization station, with form-inverter 308 pushing central wall 342 upwardly to an upwardly pushed position, FIG. 10, with sidewalls 344 extending downwardly therefrom. Form-inverter 308 has an upper central wall 346, FIG. 9, and a plurality of sidewalls 348 extending downwardly therefrom. Product cavity pocket 302 in the noted second condition, FIG. 10, is draped over and supported by form-inverter 308, with central wall 342 on central wall 346, and sidewalls 344 extending along sidewalls 348. Product cavity pocket 302 has an initial condition as shown in FIG. 9 receiving food product P therein. The package is inverted as shown in FIG. 10 to better expose food product P for pasteurization. Upper chamber 304 has an upper central wall 350, FIG. 8, and a plurality of sidewalls 352 extending downwardly therefrom. In the noted first condition, FIGS. 9, 3, of product cavity pocket 302, food product P is supported on central wall 342 of the product cavity pocket and retained by sidewalls 344 of the product cavity pocket. In the noted second condition, FIGS. 10, 4, 5, of product cavity pocket 302, food product P is supported on central wall 342 of the product cavity pocket and laterally retained by sidewalls 352 of upper chamber 304.

Figure 6:
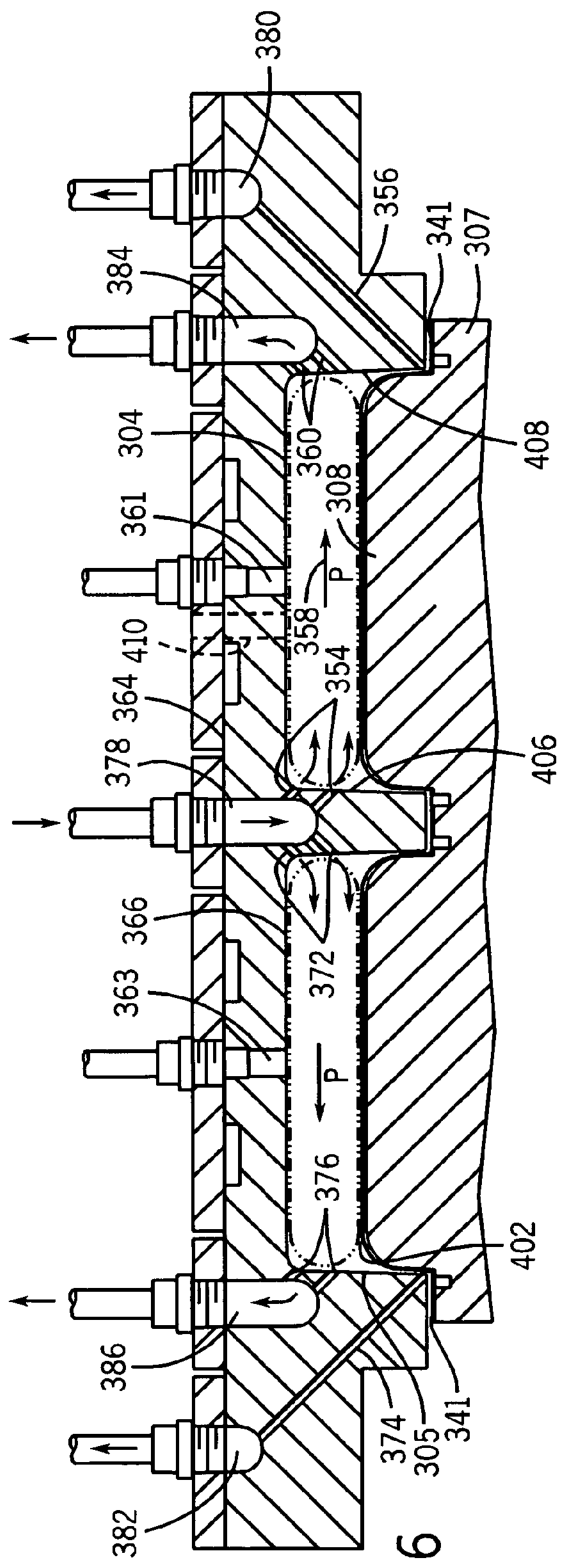
FIG. 6 is an enlarged view of a portion of FIG. 4.
Figure 7:
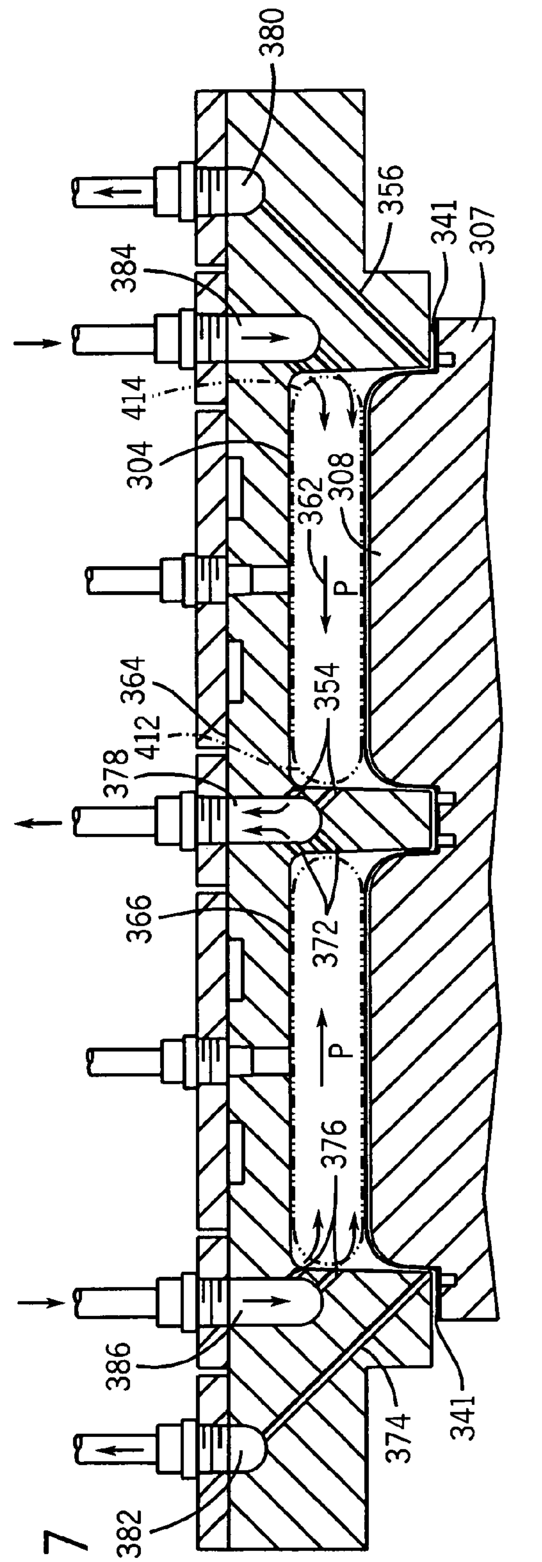
FIG. 7 is like FIG. 6 and illustrates sequential operation.

Pasteurization chamber 304, FIG. 6, has a set of one or more ports 354, and a set of one or more ports 356. Ports 354 introduce a pasteurizing medium, preferably steam, and ports 356 evacuate and vent the pasteurizing medium, such that the pasteurizing medium flows across food product P as shown at arrow 358 between ports 354 and 356. Ports 356 are at a gravitationally low section of pasteurization cavity 306 and also preferably discharge liquid condensate from the steam. Steam may be additionally or alternatively evacuated and vented at another set of one or more ports 360. In preferred form, pasteurization station 300 has a pasteurization cycle alternating between first and second modes providing alternating flow direction of the pasteurizing medium, preferably steam, across food product P. In the first mode, steam is introduced through ports 354, and in the second mode the steam is introduced through ports 360. In the first mode, the steam may be vented through ports 356 and/or ports 360. In the second mode, the steam may be vented through ports 356 and/or ports 354, the latter venting being shown at arrow 362 in FIG. 7. In another embodiment, steam is introduced simultaneously from both sets of ports 354 and 360. Pressure and/or temperature sensing is provided at pressure and/or temperature transducer ports 361, 363, for monitoring purposes and better process control if desired.

In one preferred embodiment, the pasteurization station is provided by a module 364, FIGS. 1, 8, having at least a pair of laterally spaced side by side chambers 304 and 366, FIG. 6, and further preferably a plurality of such pairs, for example one each of which is shown in FIG. 8 at 304, 368, 370 in series along the direction of web transport. The other chamber of each pair has a like set of ports; for example chamber 366, FIG. 6, has a set of one or more ports 372 and another set of one or more ports 374 and may have a further set of one or more ports 376. The pasteurization station may include one or more modules 364. Each module 364 has flow passages 378, 380, 382, and may have further flow passages 384 and 386. During the first mode of the pasteurization cycle, FIG. 6, steam is introduced through flow passage 378 and ports 354 and 372 into respective chambers 304 and 366 and is vented through respective ports 356 and 374 through respective flow passages 380 and 382, and may additionally or alternatively be vented through respective ports 360 and 376 through respective flow passages 384 and 386. Liquid condensate from the steam is discharged through respective ports 356 and 374 through respective passages 380 and 382. During the second mode of the pasteurization cycle, FIG. 7, steam is introduced through flow passages 384 and 386 and respective ports 360 and 376 into respective chamber 304 and 366, and is vented at respective ports 356 and 374 through respective passages 380 and 382 and may additionally or alternatively be vented at ports 354 and 372 through flow passage 378. Upon completion of pasteurization, the package is re-inverted to its noted initial condition, FIG. 9, by lowering form-inverter 308. The package is then advanced and closed with the upper web 25 at closing station 26 as in the noted '611 patent.

The term pasteurization is used herein in accordance with its normal dictionary definition, including partial sterilization of a substance at a temperature and for a period of exposure that destroys objectionable organisms without major chemical alteration of the substance, and including destruction of pathogenic and/or spoilage organisms for extending shelf life. The parent invention may be used with various web packaging apparatus known in the prior art, including continuous motion type web packaging machines and indexing type web packaging machines. It is preferred that plural packages of food product be simultaneously processed at the pasteurization station, FIGS. 8–10, though the parent invention is not limited to any particular number, i.e. the parent invention includes the pasteurization of one or more product packages. Furthermore, additional pasteurization stations may be added, and the parent invention includes one or more pasteurization stations, each having one or more pasteurization chambers. Food product inversion is preferred, e.g. via form-inverter 308, but is not necessary, and may be deleted if desired. The pasteurizing medium is preferably saturated steam, or alternatively hot air or superheated steam, though other types of pasteurizing media may be used.

Present Application

The present invention provides a method for processing food product P by transporting the food product through the above noted plurality of stations including pasteurization station 300, thermally pasteurizing the surface of food product P at the pasteurization station by applying a pasteurizing medium to the food product. In preferred form, the surface of the food product is pasteurized at the pasteurization station by condensing steam on the food product surface in dropwise condensation and retarding onset of film condensation by removing condensate film from the surface. In this method, it is preferred that the condensate film is removed as soon as it forms on the food product surface, such that condensation is substantially only dropwise condensation and not film condensation.

In the fluid dynamics of heat transfer, as is known, there are two different regimes of condensation of steam on cold surfaces. When a cold surface is initially exposed to steam, there is an extremely high heat transfer rate during a phase called dropwise condensation. As the condensing process continues, a film of condensate forms over the entire surface, and the heat transfer rate is slowed, with the film of condensed water acting as an insulator. Most steam heat transfer processes are based on the film-type condensation since it is the mode of heat transfer that can be readily maintained over time. Film-type condensation does have a high heat transfer rate, but dropwise condensation rates can be a full order of magnitude higher.

The method of the present invention preferably uses the higher heat transfer rate of dropwise condensation. In the present method, the condensate film is removed from the surface of food product P as soon as it forms on such surface by removing the film with directional jets provided by ports 354, 360, 372, 376. Further, in preferred form, high velocity steam is applied from the jets to physically displace food product P and lift same slightly upwardly from package surface 342 by a small gap 402, to apply steam to the entire outer surface of food product P. Steam is applied both to food product P and to the interior surface of the package at the pasteurization station. Heat is convectively transferred from the flowing and condensing steam to the surface of the food product at a rate such that the surface heat transfer coefficient becomes sufficiently higher than the food product conductance coefficient that the surface temperature of the food product is substantially instantaneously elevated above temperatures which are instantly lethal to microbes which may be present. The package with the food product therein is closed at closing station 26 immediately after pasteurization, with no processing steps between pasteurization station 300 and closing station 26. Both the food product and the package are pasteurized at the pasteurization station. The package is closed at closing station 26 with a cover provided by upper web 25. In a further embodiment, cover 25 is sterilized, for example by UV, ultraviolet, radiation, as shown at 404.

The pasteurization station includes the noted one or more chambers such as 304, each having first and second distal ends 406, 408. The pasteurizing medium provided by the steam is flowed across food product P as shown at arrow 358, FIG. 6, by introducing the steam at ports 354 at distal end 406, and venting the steam at ports 360 and/or 356 at distal end 408. As above described, the supply and venting of the pasteurizing medium may be cyclically and alternately reversed at the first and second distal ends 406 and 408 to provide alternating direction flow 358 and 362 of pasteurizing medium across food product P and providing a pulsing effect of the flow. When steam is used as the pasteurizing medium to condense on the food product to condensate, both steam and condensate are vented from the chamber, as above described.

A further port may be provided at 361 by replacing the noted transducer, or alternatively such extra port may be added as shown in dashed line at 410. In a first flush mode, pasteurizing medium is introduced at port 354 and vented at at least one of ports 360, 356, 361, 410. In a second flush mode, pasteurizing medium is introduced at port 360 and vented at at least one of ports 354, 356, 361, 410. In a third flush mode, pasteurizing medium is introduced at both of ports 354 and 360 and is vented at port 361 and/or port 410 and/or port 356. Port 361 and/or 410 is provided between ports 354 and 360. During the first flush mode, pasteurizing medium is flowed across food product P in direction 358. In the second flush mode, pasteurizing medium is flowed across food product P in direction 362, opposite to direction 358. In one embodiment of the noted third flush mode, pasteurizing medium is flowed across food product P in each of directions 358 and 362 to port 361 and/or 410. Flow may be reversed in the noted embodiments, e.g. port 361 and/or 410 may be the inlet, and port 354 and and/or 360 may be the outlet.

In the case of hot dogs as food product P, the hot dog extends longitudinally between first and second wrinkled ends 412 and 414, FIG. 10, the wrinkles being shown schematically at 416 and 418. The pasteurizing medium is introduced at each of the first and second wrinkled ends 412 and 414 at respective ports 354 and 360, simultaneously or alternately and cyclically, and flows longitudinally along the hot dog as shown at 358, 362. It has been found that the wrinkled ends of the hot dogs are more difficult to pasteurize than the longitudinal surfaces of the hot dogs. This is solved in the present system by the strategic location of the steam ports at the ends of the hot dogs and the flow of steam through the chamber removing condensation in the wrinkles 416, 418 as it forms.

Upon completion of the steam cycle, all of the vents 354, 360, 356, 361, 410 are opened to drop the chamber pressure as rapidly as possible just prior to opening the chamber cavity 306 to atmosphere. Because the depressurization process slows as the pressure approaches atmospheric, it has been learned that the chamber can be opened while some residual pressure still remains in the chamber, thereby decreasing the effective cycle time, to increase throughput rates. The process thus involves introducing pressurized pasteurizing medium into cavity chamber 306 to pasteurize the food product, and then at the end of the pasteurization cycle, opening the chamber prior to complete depressurization thereof such that the chamber is opened while some residual pressure still remains in the chamber, thereby decreasing cycle time to increase throughput rate.

In a further embodiment, immediately after pasteurization with steam, excess moisture from the food product and the package is removed with high velocity sterile air at any of ports 354, 360, 356, 361, 410 prior to closing of the package at the closing station. Alternatively, this high velocity sterile air purge of excess moisture may be carried out between pasteurization station 300 and closing station 26.

The invention provides a method for processing a non-packaged, non-encased food product by surface pasteurizing the non-encased food product in a pressurized chamber, preferably using condensing steam. In one embodiment, the steam is pulsed into the chamber as directional jets, alternating from end to end, or supplied at both ends at the same time, as above described. Desirable results have been found for a pasteurization cycle 1 to 5 seconds long, using 4 to 8 pulses during such treatment time. Steam is directed at ends, such as 406 and 408, maximizing bacteria kill in the wrinkles 416, 418. In one embodiment, steam is continuously introduced through inlet ports and vented from the opposite side through dedicated vent ports. Although the chamber is vented, inflow is faster than outflow so that pressure builds in the chamber. Pressures up to 60 psig have been used. It has been found that the most effective pressures for killing bacteria have been 10 to 60 psig. In another embodiment, instead of venting to a dedicated vent port, the steam is vented through the steam inlets on the opposite side of the chamber. The steam flow is reversed from end to end so that the inlets serve as outlets, and vice versa. In such embodiment, as above, the inflow of steam is faster than the outflow of steam and condensate, so that pressure builds in the chamber. Continuous flow of steam from inlets to outlets is significant. This avoids filling a sealed chamber and then stopping the process and then evacuating the chamber. Elimination of the stopping step and the evacuation step is desirable, and instead there is simply a venting of the condensate removal line at atmospheric pressure in one embodiment. This continuous flow helps to strip away condensate from the food product, thus enhancing heat transfer. The pasteurizing treatment may be immediately followed by a vacuum cooling step, serving the purpose of removing condensate and also the purpose of providing vacuum cooling by evaporative cooling, i.e. by evaporation of condensate. In other embodiments, instead of condensing steam, super heated steam and/or other biocidal gasses are used. In a further embodiment, a dual chamber heat treatment is used, namely condensing steam followed by super heated steam.

The invention provides a method for processing a non-encased food product by surface pasteurizing the non-encased food product in a pressurized chamber by introducing a pasteurizing medium into the chamber and venting the pasteurizing medium from the chamber at a slower outflow rate than the inflow rate of the processing medium into the chamber such that pressure in the chamber increases, thus increasing the temperature of the processing medium to an effective temperature for killing bacteria. As above noted, in a preferred embodiment, the method provides a sufficiently faster inflow rate into the chamber relative to the outflow rate to build pressure in the chamber to a range of 10 to 60 psig. The method involves providing first and second sets of ports into the chamber, providing a first cycle and inflowing the pasteurizing medium into the chamber through the first port and venting the pasteurizing medium from the chamber through the second port at a slower outflow rate than the inflow rate through the first port in the first cycle, providing a second cycle and inflowing the pasteurizing medium into the chamber through the second port and venting the pasteurizing medium from the chamber through the first port at a slower outflow rate than the inflow rate of the pasteurizing medium into the chamber through the second port in the second cycle, such that pressure builds in the chamber in each of the first and second cycles. In another embodiment, the method involves providing first and second ports into the chamber, and providing a pasteurization cycle continuously flowing the pasteurizing medium into the chamber through the first port and continuously venting the pasteurizing medium from the chamber through the second port to provide continuous flow of the pasteurizing medium across the food product during the pasteurization cycle without sealing the chamber against outflow or otherwise blocking venting of the pasteurizing medium from the chamber during the pasteurization cycle. Such pasteurization cycle may be followed by a second pasteurization cycle with reverse flow, as noted above, for example reversing the roles of the inlet and outlet ports for the second pasteurization cycle, and thus providing continuous flow in the opposite direction across the food product during such second pasteurization cycle. In the preferred embodiment, the pasteurizing medium is steam, and the continuous flow strips away steam film condensate from the food product, enhancing heat transfer. In a further embodiment, the method involves supplying the pasteurizing medium to the chamber during a pasteurization cycle, and immediately after the pasteurization cycle, providing a vacuum cooling step removing the pasteurizing medium from the chamber and vacuum cooling the product. In a further embodiment, the method involves surface pasteurizing the food product with dual chamber heat treatment, including providing a first pressurized chamber and pasteurizing the food product with condensing steam therein, and transferring the food product to a second pressurized chamber and pasteurizing the food product with super heated steam in the pressurized second chamber.

In further embodiments, upper central wall surface 346, FIG. 8, of form-inverter 308 has a plurality of ribs 420 extending transversely to the longitudinal direction of hot dogs P, or other longitudinally extending tubular food product member, to minimize surface area contact therewith (i.e. providing only a plurality of point contacts), to thus further enhance and maximize exposure of the entire outer surface of the hot dog to the pasteurizing steam. In applications where it is desired to locate the hot dogs in registry, a different set of ridges 422 may be provided on upper surface 346 of form-inverter 308, which ridges 422 extend parallel to the longitudinal direction of hot dogs P and have grooves 424 therebetween for keeping the hot dogs in line. In the preferred embodiment, the hot dogs are physically displaced from the package surface 342 of the inverted package by the high velocity steam as above noted, whether ridges 420 and/or 422 are used or not. In further alternatives, the food product may be displaced from the package or otherwise moved within the chamber by various mechanical means such as lifting, vibrating, pushing or pulling. In a further embodiment, the transfer zone between pasteurization station 300 and closing station 26 is sealed by a closed chamber or is otherwise aseptic.

It is recognized that various equivalents, alternatives, and modifications are possible within the scope of the appended claims. As above, the pasteurizing medium is preferably steam, or alternatively hot air or super heated steam, though other types of pasteurizing media, including biocidal gases, may be used.

What is claimed is:

1. A method for processing a food product comprising transporting said food product through a plurality of stations including a pasteurization station, pasteurizing the surface of said food product at said pasteurization station by applying a pasteurizing medium to said food product at said pasteurization station and convectively transferring heat from said pasteurizing medium to the surface of said food product at a sufficiently high heat transfer rate such that the surface heat transfer coefficient becomes sufficiently higher than the food product conductance coefficient that the surface temperature is substantially instantaneously elevated above temperatures which are instantly lethal to microbes which may be present, and comprising applying said pasteurizing medium to said surface of said food product with directional jets, and directing said pasteurizing medium at high enough velocity to physically displace said food product and apply said pasteurizing medium to the entire outer surface of said food product.

2. A method for processing a food product comprising transporting said food product through a plurality of stations including a loading station, a pasteurization station, and a closing station, said loading station loading said food product in a package, said pasteurization station pasteurizing the surface of said food product after said loading station, said closing station closing said package with said food product therein after said pasteurization station, and comprising pasteurizing said food product at said pasteurization station with a pasteurizing medium, and directing said pasteurizing medium at said food product at high velocity to physically displace said food product from said package and apply said pasteurizing medium to the entire outer surface of said food product.

3. A method for processing a food product comprising transporting said food product through a plurality of stations including a loading station, a pasteurization station, and a closing station, said loading station loading said food product in a package, said pasteurization station pasteurizing the surface of said food product after said loading station, said closing station closing said package with said food product therein after said pasteurization station, and comprising providing said pasteurization station with a chamber having first, second and third ports, and comprising providing a first flush mode introducing pasteurizing medium at said first port and venting said pasteurizing medium at at least one of said second and third ports, providing a second flush mode introducing pasteurizing medium at said second port and venting said pasteurizing medium at at least one of said first and third ports, and providing a third flush mode introducing pasteurizing medium at both of said first and second ports and venting said pasteurizing medium at said third port.

4. The method according to claim 3 comprising providing said third port between said first and second ports, and during said first flush mode, flowing said pasteurizing medium in a first direction across said food product, during said second flush mode, flowing said pasteurizing medium across said food product in a second direction opposite to said first direction, and during said third flush mode, flowing said pasteurizing medium in each of said first and second directions to said third port.

5. The method of according to claim 3 comprising providing said third port between said first and second ports, and during said first flush mode, flowing said pasteurizing medium in a first direction across said food product, during said second flush mode, flowing said pasteurizing medium across said food product in a second direction opposite to said first direction, and during said third flush mode, flowing said pasteurizing medium in each of said first and second directions from said third port.

* * * * *